United States Patent Office 2,787,837
Patented Apr. 9, 1957

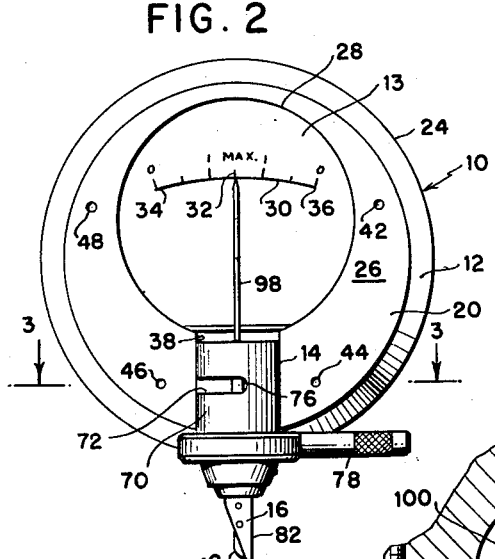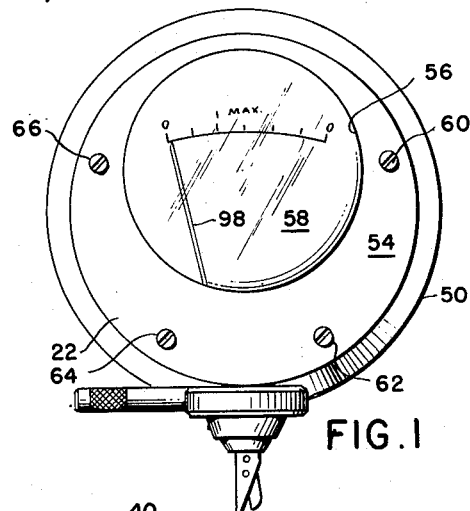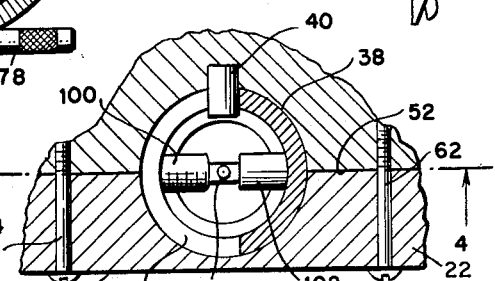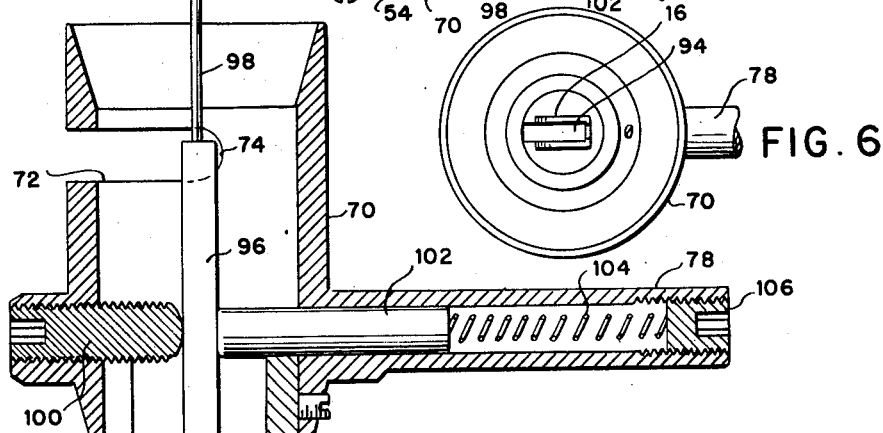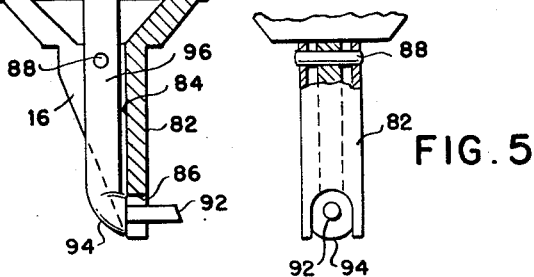

2,787,837

DENTAL MEASURING INSTRUMENT

Jack Gelfand, Brooklyn, N. Y.

Application October 30, 1953, Serial No. 389,189

3 Claims. (Cl. 33—172)

This invention relates generally to the field of measuring devices, and more particularly to an improved form thereof, particularly adapted to use in applications where the same is maintained in a relatively fixed position, and in which objects to be measured are moved toward and away from a fixed reference, being followed during such motion by a movable feeler, which indicates the degree of movement away from the fixed reference.

Reference is made to my earlier application, Serial No. 97,249, now matured as Patent No. 2,635,347, for the purpose of illustrating one of many applications in which such devices are used.

In the prior art, particularly in the field of dental measuring instruments, where opposite sides of an object supported upon a flat surface are to be measured, it has been necessary either to employ a pair of measuring devices having fixed references facing in opposite directions, or to provide a measuring device which is supported for rotation about a vertical axis, to permit the entire measuring device to be rotated to the side required for any given measurement. This structure has necessitated the providing the measuring device with either two separate fixed references, as well as feelers, or in the alternative, to provide the device having one fixed reference and feeler but a pair of dials, only one of which is visible to the user upon performing an individual measurement.

It is therefore among the principal objects of the present invention to provide a measuring device in the form of a gauge which may be maintained in relatively fixed position irrespective of which side of the device the measurement is made.

Another object of the invention lies in the provision of a measuring gauge of the class described in which only a single dial at all times within view of the operator is employed.

A further object of the invention lies in the provision of a measuring gauge of considerably simplified construction, in which all unnecessary duplication of parts has been eliminated.

A further object of the invention lies in the provision of simplified gauge structure having wide application, in which the cost of fabrication may be of a relatively low order, with consequent wide sale, distribution and use.

Still another object of the invention lies in the provision of improved gauge structure possessing all of the above enumerated advantages which, although easy to use, may be of simple and rugged construction, thereby assuring a relatively long useful life.

A feature of the invention lies in the fact that the gauge may be readily disassembled for cleaning and servicing, and as readily reassembled using ordinary tools.

These objects and features, as well as other incidental ends and advantages, will become more clearly apparent during the course of the following disclosure and be pointed out in the appended claims.

On the drawing, to which reference will be made in the specification, similar reference characters have been employed to designate corresponding parts throughout the several views.

Figure 1 is a front view in elevation showing an embodiment of the invention.

Figure 2 is a front view in elevation of the embodiment with certain of the parts removed for purposes of clarity.

Figure 3 is an enlarged fragmentary horizontal sectional view as seen from the plane 3—3 on Figure 2.

Figure 4 is an enlarged fragmentary central vertical sectional view as seen from the plane 4—4 on Figure 3.

Figure 5 is a fragmentary view in elevation, partly in section, corresponding to the lower right hand portion of Figure 4.

Figure 6 is a fragmentary bottom view.

In accordance with the invention, the device, generally indicated by reference character 10, comprises broadly: a casing element 12, a dial element 13, a rotary support element 14, fixed reference means 16, and feeler means 18.

The casing element 12 may be of any desired configuration or construction, and includes a main body member 20, and a face plate member 22.

The main body member (as shown on Figure 1) includes an outer circular surface 24 and a planar forwardly disposed surface 26. A circular recess 28 extends rearwardly from the surface 26, to accommodate the dial element 13.

The dial element 13 includes a curved scale 30, including indicated values extending from a maximum at the center point indicated by reference character 32, to first index 34 at the leftward end of the scale, and a second index 36 at the rightward end thereof.

Disposed below the dial element 13 is a semi-cylindrical supporting surface 38, provided with an anchoring stud 40, the purpose of which will become more clearly apparent at a point later in the disclosure. A plurality of threaded holes 42, 44, 46 and 48 are provided at points near the outer surface 24.

The face plate 22 corresponds generally in configuration to the main body member 20, including an outer circular edge surface 50, rearward planar surface 52, and a forward planar surface 54. A circular cut-out portion 56 corresponds to the circular recess 28 and it is preferably provided with a transparent window 58 of glass or other transparent medium. A plurality of mounting holes correspond to the threaded holes 42, 44, 46 and 48, and the face plate 22 is maintained in juxtaposition to the main body member 20 by means of screws 60, 62, 64 and 66 engageable with the above-mentioned holes.

The rotary support element 14 is preferably in the form of a hollow cylinder 70, the outer surface of which conforms in radius to that of the supporting surface 38. A horizontally disposed slot 72 is engaged by the anchoring stud 40, the slot extending through an arc of substantially 180° to be bounded by first and second terminals 74 and 76. From a consideration of Figures 2 and 4, it will be apparent that when the operating handle 78 is moved leftward or rightward, the cylinder 70 may be rotated through substantially 180°. Extending downwardly from the cylinder 70 is a fixed reference finger 16 having a reference surface 82. The finger 16 includes a hollowed portion 84, as well as a downwardly disposed cut-out portion 86 in which the feeler means 18 is disposed. A small shaft 88 extends across the hollow portion 84, to support the means 18 for rotation about a substantially horizontal axis.

The means 18 includes a contact finger 92 which is adapted to follow the configuration of the article being measured, the finger 92 being maintained in a vertical plane by a support member 94 disposed at the lower end of a lever member 96.

The lever member 96 is in turn supported for rotation about a horizontal axis by the above-mentioned shaft 88, and at the uppermost end thereof is a pointer member 98 positioned to lie forwardly of the dial element 13.

Referring to Figure 4, the maximum displacement of the pointer member 98, as measured from either the index 34 or the index 36 is determined by a stop member 100, threadably engaged in the cylinder 70. The lever 96 is resiliently urged through this position by means of a slidable member 102, in turn urged leftwardly as seen on Figure 4 by a spring 104 disposed within the operating handle 78. A threaded nut 106 seals the end of the handle 78 and provides means for adjusting the compression of the spring 104.

The device is operated in a well-known manner, in which the article to be measured (not shown) is abutted with the fixed reference surface 82, at which time the pointer member 98 is brought to the index, as shown on Figure 1. As the object being measured is displaced, the contact finger 92 moves away from the surface 82 to result in the registration of a positive value upon the scale 30. When an oppositely disposed surface of the object (not shown) is to be measured, the handle 78 is moved through substantially 180°, which movement rotates the lever 96 and pointer member 98. The measuring operation is then repeated, the result, in this case being measured from the index opposite that previously used.

It may thus be seen that I have invented novel and highly useful improvements in measuring devices in which there is provided a single fixed reference and feeler means in conjunction with a single scale which may be employed for measuring objects in a plurality of directions. The device employs a minimum of moving parts, and owing to simplified structure, the device may be both rugged and accurate.

I wish it to be understood that I do not consider the invention limited to the exact details of structure shown and set forth in this specification, for obvious modifications will occur to those skilled in the art to which the present invention pertains.

I claim:

1. A measuring device comprising: a dial element, a rotary support element mounted for limited rotation with respect to said dial element; said rotary support element including a fixed reference means and a movable feeler means pivotally mounted thereupon; said movable feeler element including a needle member juxtaposed to said dial element.

2. A measuring device comprising: a dial element, a rotary support element including fixed reference means and feeler means movably supported upon said fixed reference; needle means associated with said feeler means and movably positioned adjacent said dial element to indicate values thereupon, said dial element including a scale having identical indices at opposite ends thereof; said rotary support element being disposed for rotational movement adjacent said dial element through at least 180° with respect thereto.

3. A measuring device comprising: a casing element, a dial element disposed within said casing element; a rotary support element including fixed reference means and feeler means movably supported upon said fixed reference means; needle means associated with said feeler means and movably positioned adjacent said dial element to indicate values thereupon; said dial element including a scale having identical indices at opposite ends thereof, said rotary support elements being disposed for movement within said casing element through at least 180° with respect thereto.

References Cited in the file of this patent

UNITED STATES PATENTS

| | | |
|---|---|---|
| 820,303 | Hansen | May 8, 1906 |
| 2,129,311 | Street | Sept. 6, 1938 |
| 2,611,968 | Brown | Sept. 30, 1952 |
| 2,635,347 | Gelfand | Apr. 21, 1953 |